United States Patent
Takinami et al.

(10) Patent No.: US 10,804,973 B2
(45) Date of Patent: Oct. 13, 2020

(54) WIRELESS COMMUNICATION SYSTEM AND WIRELESS COMMUNICATION METHOD

(71) Applicant: Panasonic Corporation, Osaka (JP)

(72) Inventors: Koji Takinami, Kanagawa (JP); Tomoya Urushihara, Kanagawa (JP); Masashi Kobayashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 16/841,917

(22) Filed: Apr. 7, 2020

(65) Prior Publication Data

US 2020/0235789 A1 Jul. 23, 2020

Related U.S. Application Data

(63) Continuation of application No. PCT/JP2018/034428, filed on Sep. 18, 2018.

(30) Foreign Application Priority Data

Oct. 11, 2017 (JP) .................................. 2017-197597

(51) Int. Cl.
*H04B 7/0404* (2017.01)
*H04B 7/06* (2006.01)
(Continued)

(52) U.S. Cl.
CPC .......... *H04B 7/0404* (2013.01); *H04B 7/0602* (2013.01); *H04B 7/0834* (2013.01); *H04W 76/14* (2018.02)

(58) Field of Classification Search
CPC .......... H04B 7/0404; H04B 7/06; H04B 7/08; H04W 76/14
See application file for complete search history.

(56) References Cited

U.S. PATENT DOCUMENTS

| 9,871,570 B1* | 1/2018 | Kerhuel | H04W 4/023 |
| 2007/0142004 A1* | 6/2007 | Yokoi | H04B 7/0845 |
| | | | 455/121 |
| 2007/0270017 A1* | 11/2007 | Hardacker | H01P 1/042 |
| | | | 439/357 |

FOREIGN PATENT DOCUMENTS

JP 2007-166459 A 6/2007
JP 2014-195238 A 10/2014

OTHER PUBLICATIONS

Honma et al., "Short Range MIMO Communication", IEEE European Conference on Antennas and Propagation, NTT Network Innovation Laboratories, NTT Corporation, Yokosuka, Japan, 2009, pp. 1763-1767. (5 pages).

(Continued)

*Primary Examiner* — David S Huang
(74) *Attorney, Agent, or Firm* — Seed IP Law Group LLP

(57) ABSTRACT

A wireless communication method includes: storing antenna-pair set information and a first measurement result in association with each other for every positional-arrangement, the antenna-pair set information being information on a set of pairs of transmission antennas and reception antennas that achieves a best throughput for the positional-arrangement, the first measurement result being a measurement result of reception characteristics of a training signal transmitted from at least one of the plurality of transmission antennas; selecting current antenna-pair set information corresponding to a current positional-arrangement by comparing a second measurement result with the first measurement result stored, the second measurement result being a measurement result of reception characteristics of the training signal measured at the plurality of reception antennas in the current positional-arrangement; and establishing links between the plurality of transmission antennas and the respective plurality of reception antennas based on the (Continued)

current antenna-pair set information corresponding to the current positional-arrangement.

6 Claims, 7 Drawing Sheets

(51) Int. Cl.
*H04B 7/08* (2006.01)
*H04W 76/14* (2018.01)

(56) References Cited

OTHER PUBLICATIONS

IEEE Computer Society, "Part 11: Wireless LAN Medium Access Control (MAC) and Physical Layer (PHY) Specifications; Amendment 3. Enhancements for Very High Throughput in the 60.GHz Band," IEEE Std 802.11ad™-2012, Dec. 28, 2012, 628 pages.

\* cited by examiner

WIRELESS COMMUNICATION SYSTEM AND WIRELESS COMMUNICATION METHOD

RELATED APPLICATIONS

This application is a continuation of PCT International Application No. PCT/JP2018/034428, filed on Sep. 18, 2018, which claims the benefit of foreign priority of Japanese patent application 2017-197597 filed on Oct. 11, 2017, the contents all of which are incorporated herein by reference.

BACKGROUND

1. Technical Field

The present disclosure relates to a wireless communication system and a wireless communication method.

2. Background Art

In recent years, a size of delivery data that is handled has greatly increased. For example, passengers in an aircraft view a total size of approximately 500 gigabytes (GB) of delivery data related to one or more contents. At present, in order to update the delivery data, operators exchange hard disk drives (HDD) while the aircraft is staying at an airport. Updating this delivery data by wireless communication can reduce man-hours of operators. The same is true, for example, of updating delivery data of video advertisement in a vehicle of a train or a bus.

As a means for performing wireless communication of a large volume of delivery data like this at a high speed, wireless communication using a millimeter wave band has drawn attention. For example, IEEE802.11ad-2012 specifications, "Part 11: Wireless LAN Medium Access Control (MAC) and Physical Layer (PHY) Specifications", IEEE 2012 discloses wireless communication at an effective speed of approximately 2 gigabits per second ($Gb_ps$) in millimeter wave communication using a 60 gigahertz (GHz) band. Moreover, Naoki Honma, Kentaro Nishimori, Tomohiro Seki, and Masato Mizoguchi, "Short Range MIMO Communication", IEEE European Conference on Antennas and Propagation, 2009 discloses a technique that further increases the communication speed through simultaneous establishment of wireless links using a millimeter wave by each of a plurality of transmission antennas and a plurality of reception antennas that are facing each other.

Millimeter wave communication has a highly straight propagation property and has shorter communication distance than a communication system using an electromagnetic wave with a longer wavelength. Thus, a sharp antenna beam is used for transmission and reception. Thus, when a positional relationship between a transmission antenna and a reception antenna (hereinafter, referred to as "antenna positional relationship") is such that the transmission antenna and the reception antenna are facing each other directly in front directions (hereinafter, referred to as a "directly-front-facing state"), high communication quality (for example, a throughput) can be obtained. However, in a case where the antenna positional relationship is changed from the directly-front-facing state, the communication quality greatly deteriorates.

SUMMARY

In order to establish wireless links from which high wireless communication quality can be obtained even in a case where the antenna positional relationship is changed from the directly-front-facing state, it is effective to make it changeable regarding a set of pairs of transmission antennas and reception antennas (hereinafter, referred to as a "set of antenna pairs") that establish the wireless links. However, no conventional technique has been disclosed that specifies a best set of antenna pairs in a short period of time.

One non-limiting and exemplary embodiment of the present disclosure facilitates providing a wireless communication system and a wireless communication method capable of responding to a change in the antenna positional relationship and specifying a set of antenna pairs from which the best wireless communication quality can be obtained in a short period of time.

A wireless communication system according to one aspect of the present disclosure includes: transmission circuitry including a plurality of transmission antennas; reception circuitry including a plurality of reception antennas; pairing information management circuitry configured to store antenna-pair set information and a first measurement result in association with each other for every positional-arrangement of a plurality of positional-arrangements of the transmission circuitry and the reception circuitry, the antenna-pair set information being information on a set of pairs of the transmission antennas and the reception antennas that achieves a best throughput for the positional-arrangement, the first measurement result being a measurement result of reception characteristics of a training signal transmitted from at least one of the plurality of transmission antennas and measured at the plurality of reception antennas; pairing determination circuitry configured to select current antenna-pair set information corresponding to a current positional-arrangement for communication between the transmission circuitry and the reception circuitry by comparing a second measurement result with the first measurement result stored in the pairing information management circuitry, the second measurement result being a measurement result of reception characteristics of the training signal transmitted from at least one of the plurality of transmission antennas and measured at the plurality of reception antennas in the current positional-arrangement; and link establishing circuitry configured to establish links between the plurality of transmission antennas and the respective plurality of reception antennas based on the current antenna-pair set information corresponding to the current positional-arrangement, wherein at least one of the transmission circuitry or the reception circuitry is to be mounted on a mobile body.

Note that these general or specific aspects may be implemented by a system, a method, an integrated circuit, a computer program, or a recording medium, and may also be implemented by any combination of the system, the device, the method, the integrated circuit, the computer program, and the recording medium.

According to one aspect of the present disclosure, in a case where positional relationships between a plurality of transmission antennas and a plurality of reception antennas are changed, a best set of antenna pairs can be specified and wireless links can be established in a short period of time.

Additional advantages and effects of one aspect of the present disclosure will become apparent from the specification and drawings. The advantages and/or effects may be individually obtained by an exemplary embodiment and features of the specification and drawings, which need not all be provided in order to obtain one or more of such advantages and/or effects.

DETAILED DESCRIPTION OF PREFERRED EMBODIMENTS

Figure 1:
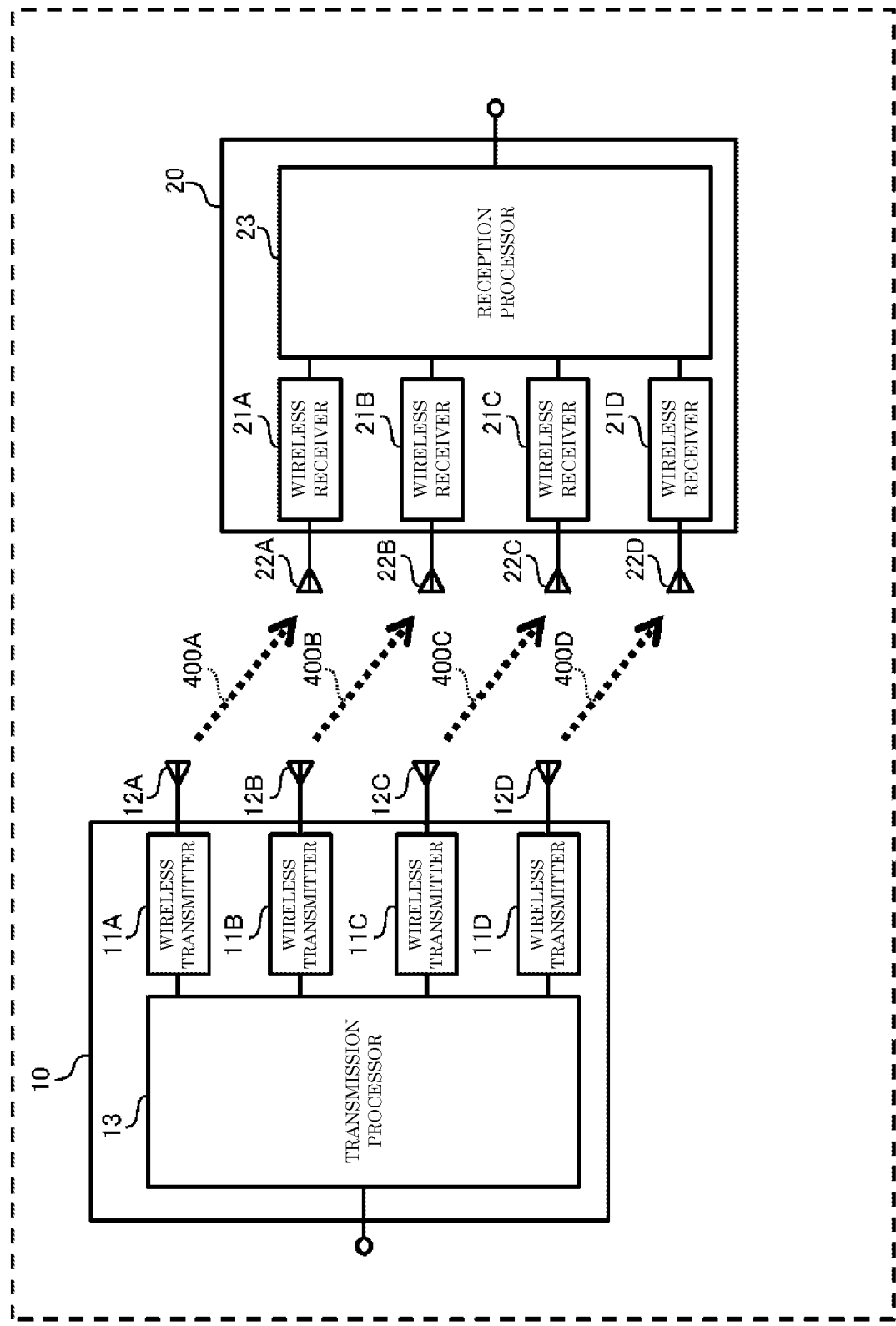
FIG. 1 is a block diagram showing a configuration example of a transmission device and a reception device.

Transmission device 10 of FIG. 1 includes N wireless transmitters (wireless transmission units) 11A, 11B, 11C, 11D (N is an integer of 2 or more. In FIG. 1, N is 4), N transmission antennas 12A, 12B, 12C, 12D, and transmission processor (transmission process unit) 13. N wireless transmitters 11A to 11D are connected to N transmission antennas 12A to 12D on a one-to-one basis, respectively.

Reception device 20 of FIG. 1 includes N wireless receivers (wireless reception units) 21A, 21B, 21C, 21D, N reception antennas 22A, 22B, 22C, 22D, and reception processor (reception process unit) 23. N wireless receivers 21A to 21D are connected to N reception antennas 22A to 22D on a one-to-one basis, respectively.

When performing wireless communication, transmission device 10 and reception device 20 pair N transmission antennas 12A, 12B, 12C, 12D and N reception antennas 22A, 22B, 22C, 22D on a one-to-one basis, respectively, and establish wireless links 400A, 400B, 400C, 400D between paired transmission antennas 12A, 12B, 12C, 12D and reception antennas 22A, 22B, 22C, 22D.

Here, a case is considered where a set of pairs of transmission antennas 12 and reception antennas 22 (set of antenna pairs) for establishing wireless links 400 is fixedly defined in advance. For example, the set of antenna pairs is fixedly defined in advance as follows: transmission antenna 12A and reception antenna 22A; transmission antenna 12B and reception antenna 22B; transmission antenna 12C and reception antenna 22C; and transmission antenna 12D and reception antenna 22D.

However, after the set of antenna pairs is fixedly defined in advance, as shown in FIG. 1, when transmission antennas 12 and reception antennas 22 change from the directly-front-facing state, wireless communication quality (for example, a throughput) greatly decreases and delivery data cannot be easily transmitted at a high speed (in a short period of time).

For example, the following system is considered. Transmission device 10 is installed in a station platform, reception device 20 is installed in a train, and while the train is stopping at the station platform, the system transmits by wireless delivery data using millimeter wave communication from transmission device 10 (station platform) to reception device 20 (inside the train). When the train stops at a position where each of reception antennas 22A to 22D of reception device 20 and each of transmission antennas 12A to 12D of transmission device 10 are in the directly-front-facing state, this system can transmit the delivery data at a high speed. However, when the train stops at a position different from the directly-front-facing state, the wireless communication quality deteriorates and the delivery data cannot be easily transmitted at a high speed (in a short period of time).

In order to obtain high communication quality even when the train stops at a position different from that establishes the directly-front-facing state, following searching processing needs to be performed in the position. That is, for each of a plurality of different sets of antenna pairs, wireless links are established and wireless communication quality is measured, and among the sets of antenna pairs, a set of antenna pairs from which best wireless communication quality is measured is specified. When a stopping time and data transmission time are taken into consideration, this searching processing takes a relatively long time, and thus cannot be easily performed within a limited period of time while the train is stopping at the station platform.

Therefore, the present disclosure relates to, responding to a change in the antenna positional relationship, determining, in a short period of time, a set of antenna pairs from which the best wireless communication quality can be obtained in the antenna positional relationship.

Hereinafter, an exemplary embodiment of the present disclosure will be described in detail with reference to the drawings as appropriate. However, an unnecessarily detailed description will be omitted in some cases. For example, a detailed description of a well-known matter and a duplicated description of substantially the same configuration will be omitted in some cases. This is to avoid unnecessary redundancy in the following description and to facilitate understanding by those skilled in the art.

Note that the attached drawings and the following description are provided for those skilled in the art to fully understand the present disclosure, and are not intended to limit the subject matter as described in the appended claims.

Further, when the same kind of elements are described in distinction from each other, reference marks may be used such as "transmission antenna 102A" and "transmission antenna 102B". When the same kind of elements are described without being distinguished from each other, a common number among the reference marks such as "transmission antennas 102" may be used.

Exemplary Embodiment

<Configuration of Wireless Communication System>

Figure 2:
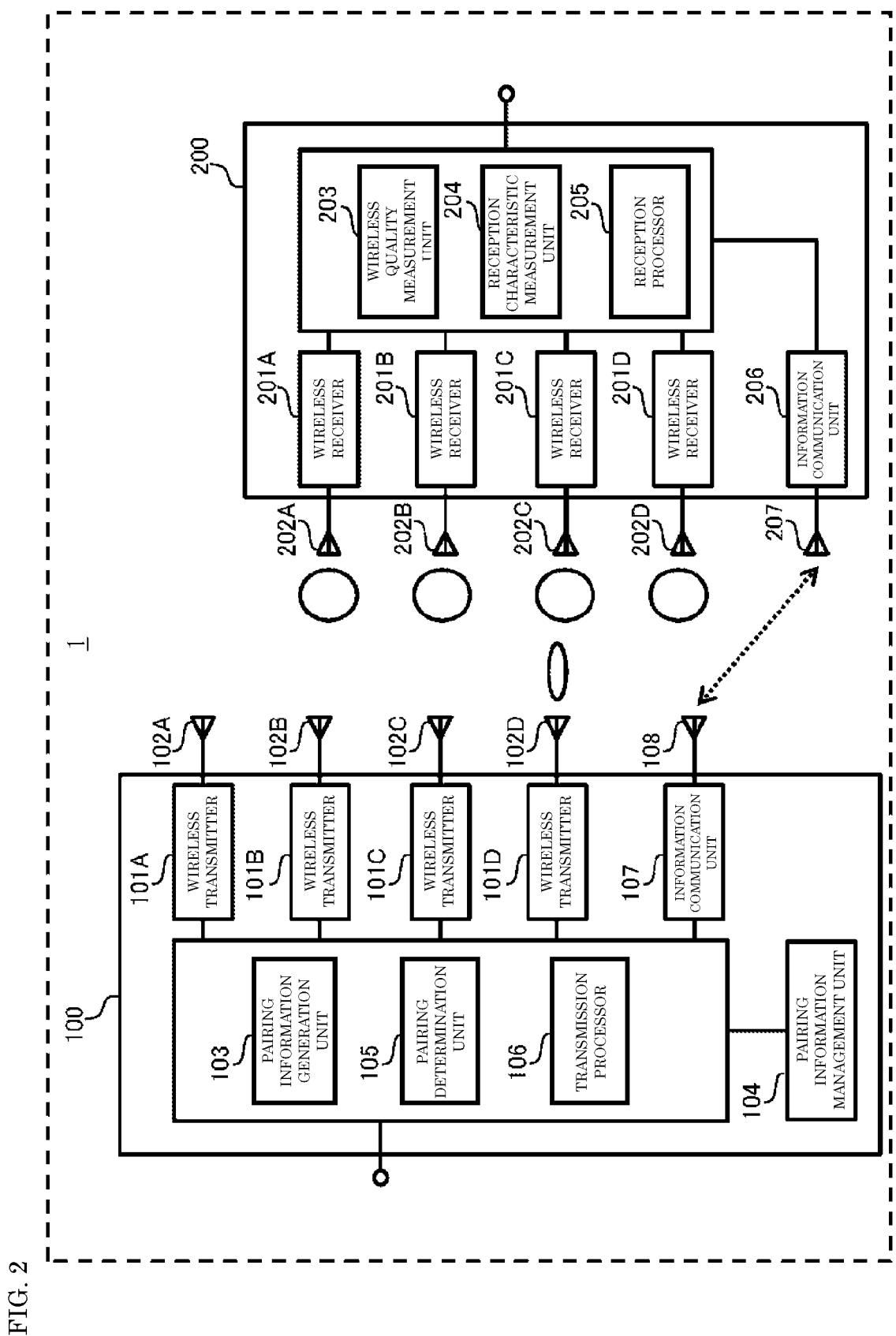
FIG. 2 is a block diagram showing an example of a configuration of a wireless communication system and an operation during generation of pairing information according to the present exemplary embodiment.
Figure 3:
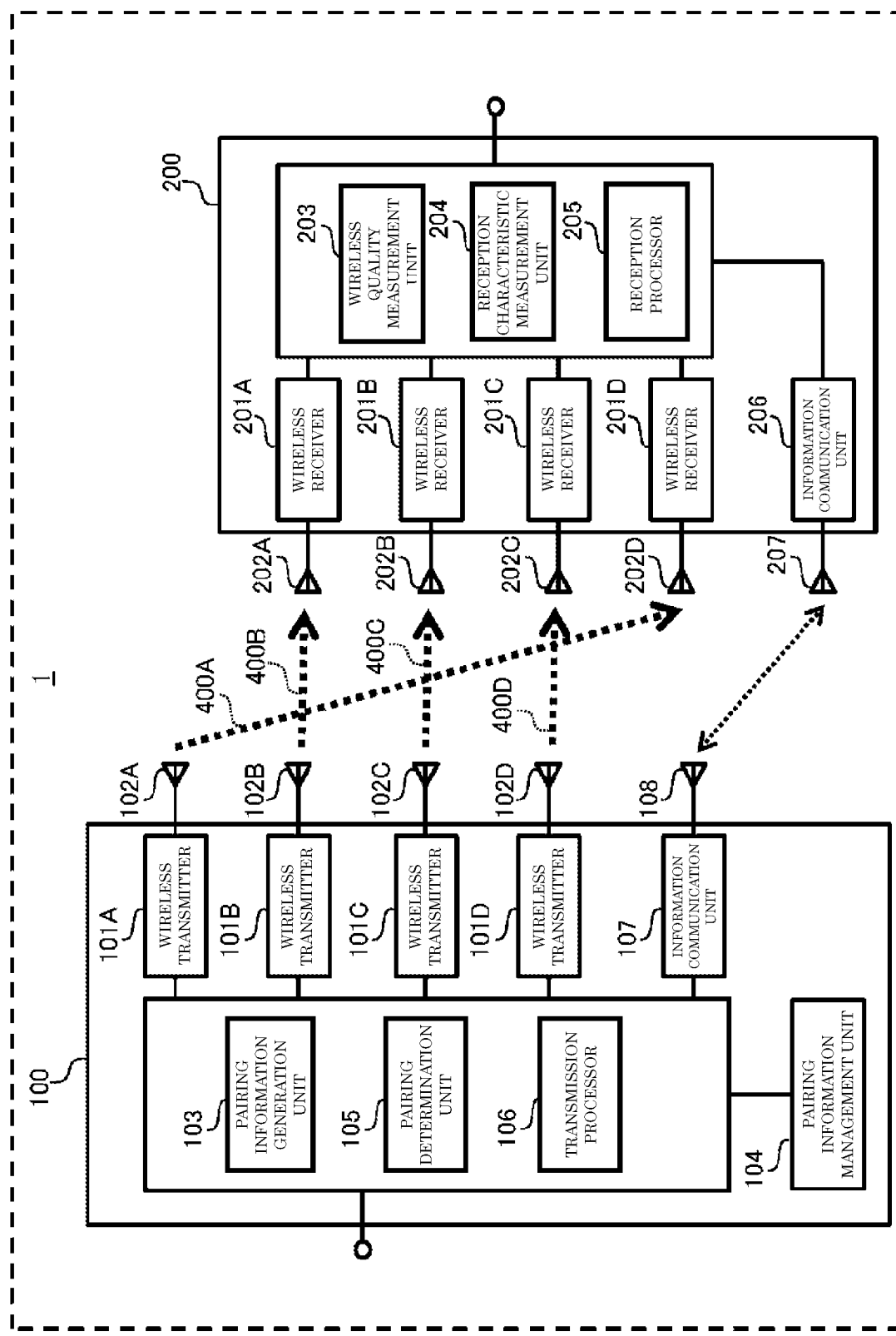
FIG. 3 is a block diagram showing an example of the configuration of the wireless communication system and an operation during transmission of delivery data according to the present exemplary embodiment.

Next, with reference to FIGS. 2 and 3, a configuration example of wireless communication system 1 including transmission device 100 and reception device 200 at least one of which is installed in a moving object. Note that FIG. 2 shows an operation during generation of pairing information. FIG. 3 shows an operation during transmission of delivery data.

Transmission device 100 includes N wireless transmitters (N is an integer of 2 or more. In FIGS. 2 and 3, N is 4) 101A, 101B, 101C, 101D, N transmission antennas 102A, 102B, 102C, 102D, pairing information generation unit 103, pairing information management unit 104, pairing determination unit 105, transmission processor 106, information communication unit 107 of transmission device 100, and communication antenna 108 of transmission device 100. N wireless transmitters 101A to 101D are connected to N transmission antennas 102A to 102D on a one-to-one basis, respectively.

Reception device 200 includes N wireless receivers 201A, 201B, 201C, 201D, N reception antennas 202A, 202B, 202C, 202D, wireless quality measurement unit 203, reception characteristic measurement unit 204, reception processor 205, information communication unit 206 of reception device 200, and communication antenna 207 of reception device 200. N wireless receivers 201A to 201D are connected to N reception antennas 202A to 202D on a one-to-one basis, respectively.

<Configuration of Transmission Device>

Each configuration element included in transmission device 100 will be described next.

N transmission antennas 102 (N wireless transmitters 101) establish wireless links 400 with N reception antennas 202 (N wireless receivers 201) on a one-to-one basis, respectively. However, which transmission antennas 102 establish wireless links 400 with which reception antennas 202 are not fixed. For wireless link communication, a millimeter wave whose communication speed is relatively fast are used. As a wireless communication system using the millimeter wave, wireless high definition (HD), wireless gigabit (WiGig), and IEEE802.11ad, IEEE802.11ay can be exemplified. Moreover, through the establishment of a plurality of wireless links 400, the communication speed in a wireless section becomes faster.

Pairing information generation unit 103 sets antenna positional relationships between transmission antennas 102 and reception antennas 202, establishes wireless links of a plurality of different sets of antenna pairs in the set antenna positional relationships, measures wireless communication quality (for example, a throughput) in each of the sets of antenna pairs, and searches for a set of antenna pairs from which the best wireless communication quality can be measured. Hereinafter, the set of antenna pairs from which the best wireless communication quality is measured that is specified by pairing information generation unit 103 is referred to as a "best set of antenna pairs". Moreover, in the set antenna positional relationships, pairing information generation unit 103 transmits a training signal from at least one transmission antenna 102, and measures reception characteristics in reception antennas 202 of the training signal. For example, in FIG. 2, a training signal is transmitted from transmission antenna 102D and the reception characteristics are measured. Pairing information generation unit 103 performs this measurement in a plurality of different antenna positional relationships, and searches for the best set of antenna pairs for each of the plurality of different antenna positional relationships.

Pairing information generation unit 103 then associates the measured reception characteristics with the best set of antenna pairs to generate pairing information, and registers the pairing information in pairing information management unit 104. Pairing information generation unit 103 generates pairing information for each of the antenna positional relationships. Processing of pairing information generation unit 103 is performed before the wireless links are established for transmission of delivery data. The reception characteristics that are measured by pairing information generation unit 103 and registered in pairing information management unit 104 in advance are referred to as "reference reception characteristics". Note that details of the processing of pairing information generation unit 103 will be described later (see FIG. 5).

The reception characteristics are received power (received signal strength), in each of reception antennas 202, of the training signal transmitted from at least one transmission antenna 102. However, the reception characteristics are not limited to this, and can be, for example, a delay profile of a reception signal, a frequency spectrum, a signal-to-interference noise power ratio, or any combination of these.

After the antenna positional relationships are determined (for example, after a train including reception device 200 stops at a station platform), pairing determination unit 105 transmits the training signal from at least one transmission antenna 102, and measures the reception characteristics of the training signal in reception antennas 202. Hereinafter, the reception characteristics measured by pairing determination unit 105 are referred to as "measured reception characteristics". Pairing determination unit 105 then specifies, from pairing information management unit 104, the best set of antenna pairs associated with the reference reception characteristics that are closest to the measured reception characteristics. Note that details of the processing of pairing determination unit 105 will be described later (see FIG. 6).

Transmission processor 106 establishes wireless links 400 between transmission antennas 102 and reception antennas 202 according to the best set of antenna pairs specified by pairing determination unit 105. Transmission processor 106 then transmits delivery data to reception device 200 via these established wireless links 400.

For example, based on the measured reception characteristics, from pairing information management unit 104, pairing determination unit 105 specifies the best set of antenna pairs as follows: a set of antenna pairs of transmission antenna 102A and reception antenna 202D; transmission antenna 102B and reception antenna 202A; transmission antenna 102C and reception antenna 202B; and transmission antenna 102D and reception antenna 202C. In this case, as shown in FIG. 3, transmission processor 106 establishes wireless link 400A between transmission antenna 102A and reception antenna 202D, wireless link 400B between transmission antenna 102B and reception antenna 202A, wireless link 400C between transmission antenna 102C and reception antenna 202B, and wireless link 400D between transmission antenna 102D and reception antenna 202C.

Information communication unit 107 of transmission device 100 receives the wireless communication quality, reference reception characteristics, and measured reception characteristics from reception device 200 via communication antenna 108 of transmission device 100. Moreover, information communication unit 107 of transmission device 100 transmits information of the best set of antenna pairs determined by pairing determination unit 105 to reception device 200 via communication antenna 108 of transmission device 100. A wavelength longer than a millimeter wave (for example, microwave, centimeter wave, or the like) may be used for the wireless communication by communication antenna 108 of transmission device 100. In this way, even when communication antenna 108 of transmission device 100 and communication antenna 207 of reception device 200 are changed from the directly-front-facing state, these pieces of information can be stably transmitted and received.

<Configuration of Reception Device>

Each configuration element included in reception device 200 will be described next.

N reception antennas 202 (N wireless receivers 201) establish wireless links 400 with N transmission antennas 102 (N wireless transmitters 101) on a one-to-one basis, respectively. However, which transmission antennas 102 establish wireless links 400 with which reception antennas 202 are not fixed.

Wireless quality measurement unit 203 measures wireless communication quality (for example, a throughput) using a data signal for measurement of communication quality transmitted by transmission device 100.

Reception characteristic measurement unit 204 measures reference reception characteristics and measured reception characteristics in reception antennas 202 using a training signal transmitted from transmission device 100.

Reception processor 205 establishes wireless links 400 between transmission antennas 102 and reception antennas 202 according to the best set of antenna pairs received from transmission device 100. Reception processor 205 receives delivery data from transmission device 100 via these wireless links 400. Note that the configuration elements that perform processing for establishing wireless links 400 in transmission processor 106 and/or reception processor 205 may be referred to as a "wireless link establishment unit".

Information communication unit 206 of reception device 200 transmits the wireless communication quality measured by wireless quality measurement unit 203 and the reference reception characteristics and measured reception characteristics measured by reception characteristic measurement unit 204 to transmission device 100 via communication antenna 207 of reception device 200. Moreover, information communication unit 206 of reception device 200 receives information of the best set of antenna pairs from transmission device 100 via communication antenna 207 of reception device 200.

<Details of Pairing Information Management Unit>

Figure 4:
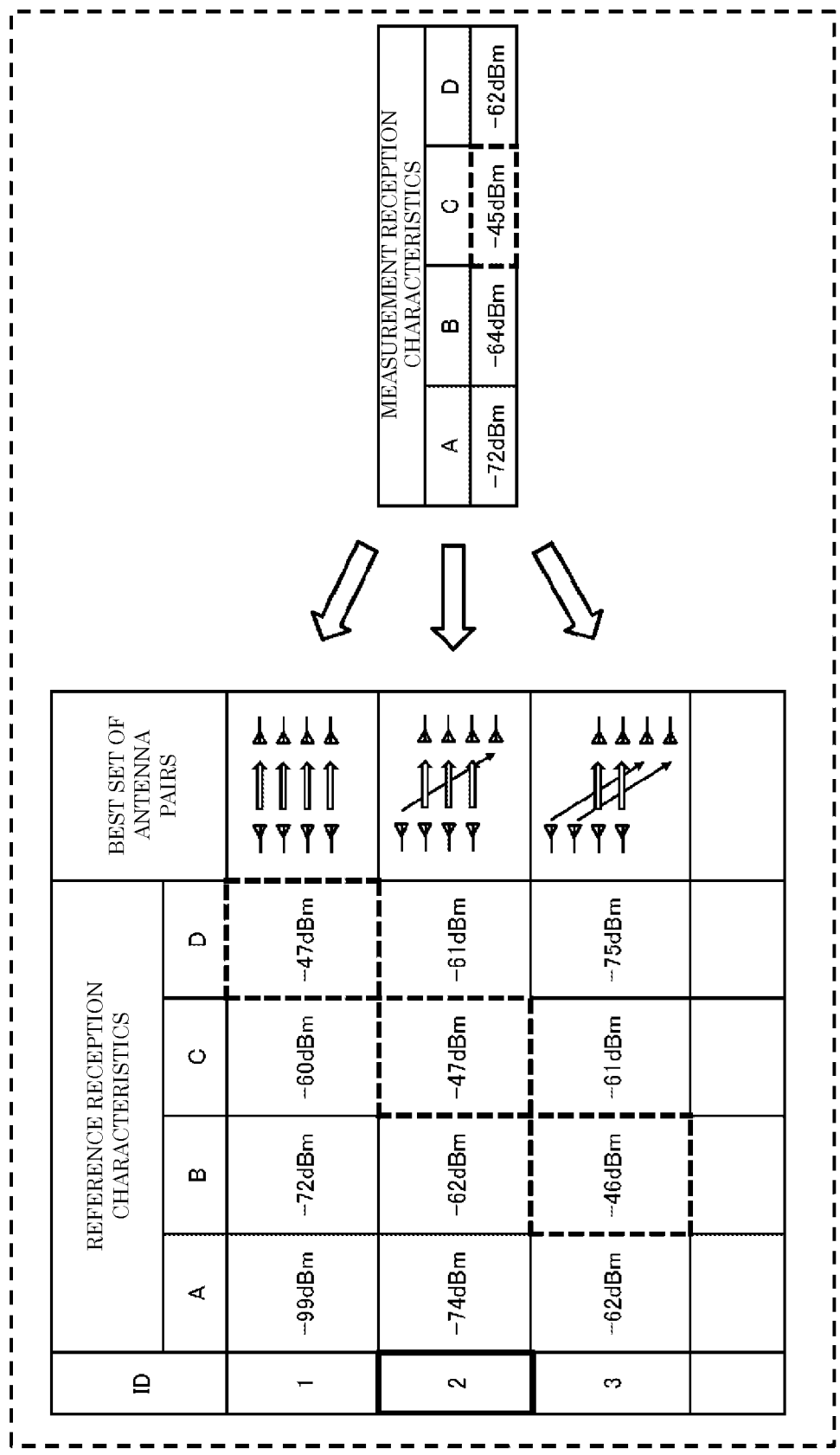
FIG. 4 is a diagram showing an example of information managed in a pairing information management unit according to the present exemplary embodiment.

With reference to FIG. 4, pairing information managed in pairing information management unit 104 will be described next.

Pairing information management unit 104 manages pairing information in which received power (received signal strength) of a training signal in each of reception antennas 202A, 202B, 202C, 202D serving as an example of the reference reception characteristics is associated with the best set of antenna pairs. Note that as in FIG. 2, the reference reception characteristics in FIG. 4 are obtained through reception and measurement of the training signal transmitted from transmission antenna 102D of transmission device 100 by reception device 200.

Here, in ID1, reference reception characteristics D have the best reception characteristics, and pairing information management unit 104 sets a set of antenna pairs in which transmission antennas 102A to 102D and reception antennas 202A to 202D are opposite to each other, respectively, as the best set of antenna pairs having a high throughput.

Moreover, in ID2, reference reception characteristics C have the best reception characteristics, and pairing information management unit 104 sets a set of antenna pairs in which transmission antennas 102B to 102D and reception antennas 202A to 202C are opposite to each other, respectively, as the best set of antenna pairs.

Moreover, in ID3, reference reception characteristics B have the best reception characteristics, and pairing information management unit 104 sets a set of antenna pairs in which transmission antennas 102C to 102D and reception antennas 202A to 202B are opposite to each other, respectively, as the best set of antenna pairs.

The measured reception characteristics in FIG. 4 show reception characteristics of reception device 200 when the training signal is transmitted from transmission antenna 102D of transmission device 100. Pairing determination unit 105 determines that the measured reception characteristics are similar to the reference reception characteristics of ID2, and selects the best set of antenna pairs in ID2.

In an antenna positional relationship in which the reference reception characteristics have been measured, for example, as shown in FIG. 2, in an antenna positional relationship in which transmission antenna 102D is opposite to reception antenna 202C, when wireless links are established while transmission antenna 102A and reception antenna 202D, transmission antenna 102B and reception antenna 202A, transmission antenna 102C and reception antenna 202B, and transmission antenna 102D and reception antenna 202C serve as a set of antenna pairs, the best wireless communication quality (for example, a maximum throughput) can be obtained. In other words, in the case of the reference reception characteristics shown in ID "2" of FIG. 4, through establishment of wireless links according to the best set of antenna pairs associated with ID "2", the best wireless communication quality can be obtained.

Note that typically, as shown in the best set of antenna pairs of FIG. 4, when transmission antenna 102 and reception antenna 202 that are in the directly-front-facing state are preferentially paired, the best wireless communication quality is often obtained.

Here, the description has been given considering that the antenna that transmits the training signal is transmission antenna 102D of transmission device 100. However, the present exemplary embodiment is not limited to this. This means that the training signal may be transmitted by any transmission antenna. Moreover, the reference reception characteristics may be accumulated for each of reception antennas 202A to 202D.

<Processing of Pairing Information Generation>

With reference to a flowchart of FIG. 5, processing of pairing information generation will be described next. Note that the processing is performed in advance before measured reception characteristics are measured.

First, pairing information generation unit 103 sets an antenna positional relationship in loop processing of antenna positional relationship (S101 to S109) this time (S101). For example, each time the loop processing of antenna positional relationship is performed, pairing information generation unit 103 adds predetermined value a to relative distance L (an initial value of L is 0) between transmission antenna 102A and reception antenna 202A.

Next, pairing information generation unit 103 selects one set of antenna pairs in loop processing of set of antenna pairs (S102 to S105) this time (S102). This means that each time the loop processing of set of antenna pairs is performed, pairing information generation unit 103 selects one different set of antenna pairs. For example, as shown in FIG. 2, when a number of each of transmission antennas 102 and reception antennas 202 is four, a number of antenna pairs (a number of combinations of four transmission antennas 102 and four reception antennas 202) is "24".

Next, transmission processor 106 and reception processor 205 establish wireless links 400 between transmission antennas 102 and reception antennas 202 according to the set of antenna pairs selected in S102 (S103).

Next, through wireless links 400 established in S103, pairing information generation unit 103 transmits a data signal for measurement of wireless communication quality (for example, a throughput) (S104).

Wireless quality measurement unit 203 of reception device 200 measures the wireless communication quality of the data signal received via wireless links 400 established in S103 (S105). Wireless quality measurement unit 203 then transmits the measured wireless communication quality to transmission device 100 via information communication unit 206 of reception device 200 and communication antenna 207 of reception device 200. Pairing information generation unit 103 receives information of the measured wireless communication quality via communication antenna 108 of transmission device 100 and information communication unit 107 of transmission device 100.

Pairing information generation unit 103 repeats the loop processing of set of antenna pairs and obtains pieces of the wireless communication quality of all sets of antenna pairs.

After completing the loop processing of set of antenna pairs, pairing information generation unit 103 specifies a set of antenna pairs from which the best wireless communication quality is measured (that is, the best set of antenna pairs) among the obtained pieces of the wireless communication quality (S106).

Next, pairing information generation unit 103 transmits the training signal from at least one transmission antenna 102 (S107). At this time, pairing information generation unit 103 may control transmission antenna 102 such that the training signal linearly advances toward reception device 200.

Reception characteristic measurement unit 204 of reception device 200 measures reference reception characteristics of the training signal transmitted in S107 in each of reception antennas 202 (S108). At this time, reception characteristic measurement unit 204 may control reception antennas 202 such that the training signal is received at a wide angle and for example, the antennas become pseudo omni-antennas. Reception characteristic measurement unit 204 then transmits the measured reference reception characteristics to transmission device 100 via information communication unit 206 of reception device 200 and communication antenna 207 of reception device 200. Pairing information generation unit 103 receives the measured reference reception characteristics via communication antenna 108 of transmission device 100 and information communication unit 107 of transmission device 100.

Next, pairing information generation unit 103 associates the best set of antenna pairs specified in S106 with the reference reception characteristics received in S108 to generate pairing information, and registers the pairing information in pairing information management unit 104 (S109). This means that in this pairing information, the reference reception characteristics and the best set of antenna pairs in the antenna positional relationship set in S101 are associated with each other.

Pairing information generation unit 103 repeats the loop processing of antenna positional relationship, generates pieces of pairing information in all antenna positional relationships, and registers the pieces of pairing information in pairing information management unit 104. For example, pairing information generation unit 103 repeats the loop processing of antenna positional relationship until relative distance L is more than or equal to a predetermined threshold value. After completing the loop processing of antenna positional relationship, pairing information generation unit 103 completes this processing.

Through the processing described above, the pieces of pairing information with respect to a plurality of different antenna positional relationships are registered in pairing information management unit 104. This means that using the pieces of pairing information, the best set of antenna pairs that changes depending on the antenna positional relationship is associated with the reference reception characteristics measured by the training signal transmitted by at least one transmission antenna 102 for each antenna positional relationship. In this way, through transmission of the training signal by at least transmission antenna 102, the best set of antenna pairs in actual data communication can be selected. As a result, the time required for selecting the best set of antenna pairs can be reduced.

<Processing of Delivery Data Transmission>

Figure 6:
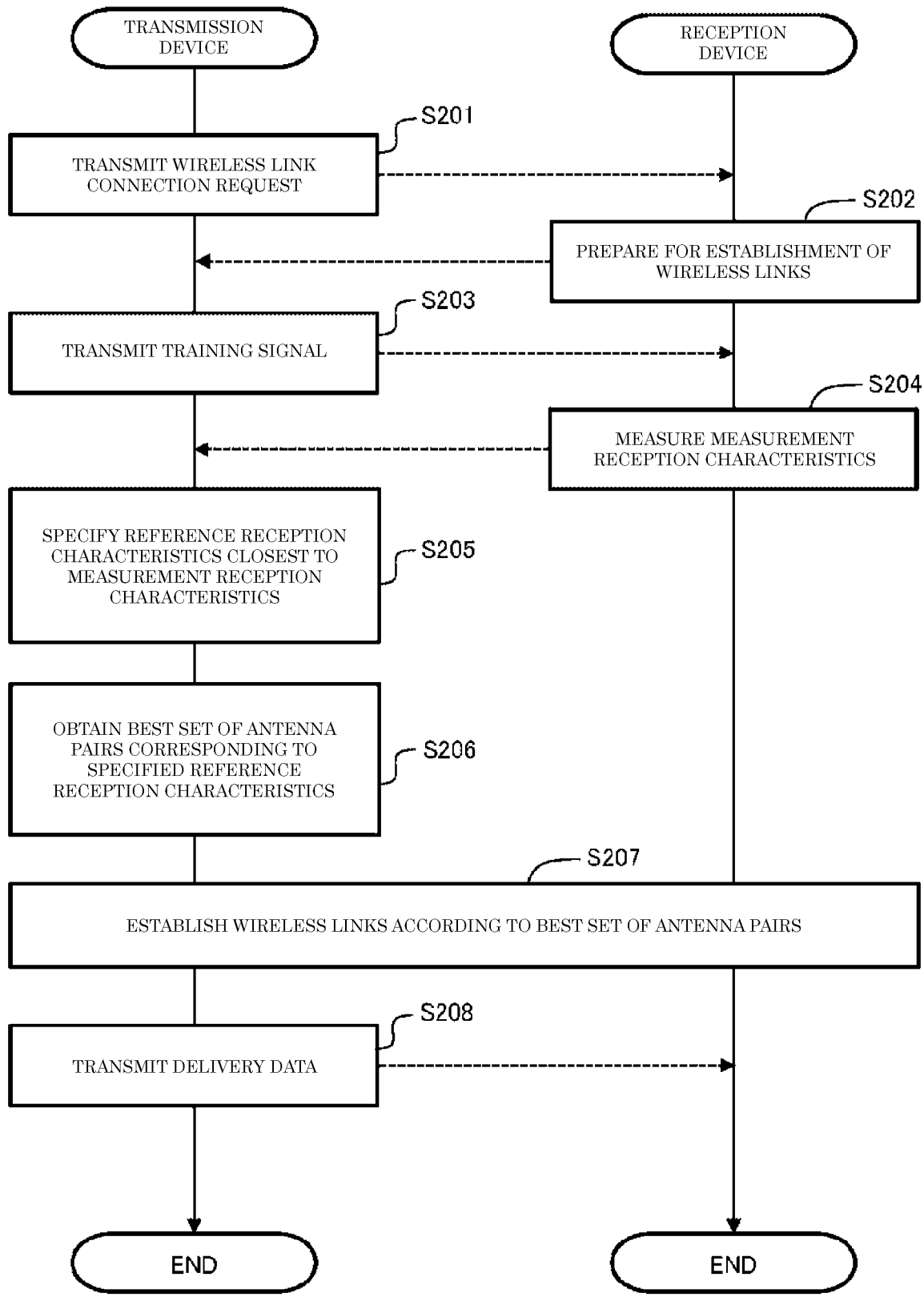
FIG. 6 is a flowchart showing an example of processing of delivery data transmission according to the present exemplary embodiment.

With reference to a flowchart of FIG. 6, processing of delivery data transmission will be described next.

First, after an antenna positional relationship is determined (for example, after a train including reception device 200 stops at a station platform), transmission processor 106 transmits a wireless link connection request to reception device 200 via information communication unit 107 of transmission device 100 and communication antenna 108 of transmission device 100 (S201).

Reception processor 205 of reception device 200 receives the wireless link connection request in S201 via communication antenna 207 of reception device 200 and information communication unit 206 of reception device 200 and prepares for establishing wireless links (S202).

Next, pairing determination unit 105 transmits the training signal from at least one transmission antenna 102 (S203). At this time, pairing information generation unit 103 may control transmission antenna 102 such that the training signal linearly advances toward reception device 200.

Reception characteristic measurement unit 204 of reception device 200 measures measured reception characteristics of the training signal transmitted in S203 in each of reception antennas 202 (S204). At this time, reception characteristic measurement unit 204 may control reception antennas 202 such that the training signal is received at a wide angle and for example, the antennas become pseudo omni-antennas. Reception characteristic measurement unit 204 then transmits the measured reception characteristics to transmission device 100 via information communication unit 206 of reception device 200 and communication antenna 207 of reception device 200.

Pairing determination unit 105 specifies the reference reception characteristics that are closest to the measured reception characteristics in S204 from pairing information management unit 104 (S205). For example, as shown in FIG. 4, pairing determination unit 105 is assumed to obtain the following measured reception characteristics: the received power of reception antenna 202A is "−72 dBm"; the received power of reception antenna 202B is "−64 dBm"; the received power of reception antenna 202C is "−45 dBm"; and the received power of reception antenna 202D is "−62 dBm". In this case, pairing determination unit 105 calculates a difference between the measured reception characteristics and reference reception characteristics based on, for example, a least-square method, and specifies ID "2" in FIG. 4, from which the smallest difference is obtained, as the reference reception characteristics that are closest to the measured reception characteristics.

Next, pairing determination unit 105 specifies, from pairing information management unit 104, the best set of antenna pairs associated with the reference reception characteristics specified in S205 (S206).

Next, transmission processor 106 and reception processor 205 establish wireless links 400 between transmission antennas 102 and reception antennas 202 according to the best set of antenna pairs in S206 (S207). For example, in a case where the best set of antenna pairs of ID "2" is obtained from pairing information management unit 104 of FIG. 4 in S206, as shown in FIG. 3, transmission processor 106 establishes wireless links 400A, 400B, 400C, 400D between transmission antenna 102A and reception antenna 202D, transmission antenna 102B and reception antenna 202A, transmission antenna 102C and reception antenna 202B, and transmission antenna 102D and reception antenna 202C, respectively. In this way, in the antenna positional relationship determined in S201, wireless communication system 1 can establish wireless links 400A to 400D from which the best wireless communication quality (for example, a maximum throughput) can be obtained in a short period of time.

Transmission processor 106 then transmits delivery data to reception device 200 via wireless links 400A to 400D established in S207 (S208). On the other hand, reception processor 205 receives the delivery data from transmission device 100 via wireless links 400A to 400D.

Through the processing described above, even in a case where the antenna positional relationship is changed, using the pairing information that is registered in advance in pairing information management unit 104, wireless communication system 1 can specify a set of antenna pairs from which the best wireless communication quality can be obtained in the antenna positional relationship of the time in a short period of time. As a result, wireless communication system 1 can establish wireless links 400 from which the best wireless communication quality can be obtained in a short period of time and transmit the delivery data from transmission device 100 to reception device 200 at a high speed (in a short period of time).

<Modification of Present Exemplary Embodiment>

A modification of the present exemplary embodiment will be described next.

In the present exemplary embodiment, pairing information generation unit 103, pairing determination unit 105, and pairing information management unit 104 are provided in transmission device 100. Alternatively, at least one of these configuration elements may be provided in reception device 200.

In the present exemplary embodiment, transmission device 100 and reception device 200 transmit and receive control information such as wireless communication quality, reference reception characteristics, and measured reception characteristics using communication antennas 108, 207, which are different from transmission antennas 102 and reception antennas 202. Alternatively, transmission device 100 and reception device 200 may transmit and receive the control information using transmission antennas 102 and reception antennas 202. For transmission and reception of the control information, a wireless communication system having a relatively small error rate (relatively large level of redundancy) may be used.

Figure 5:
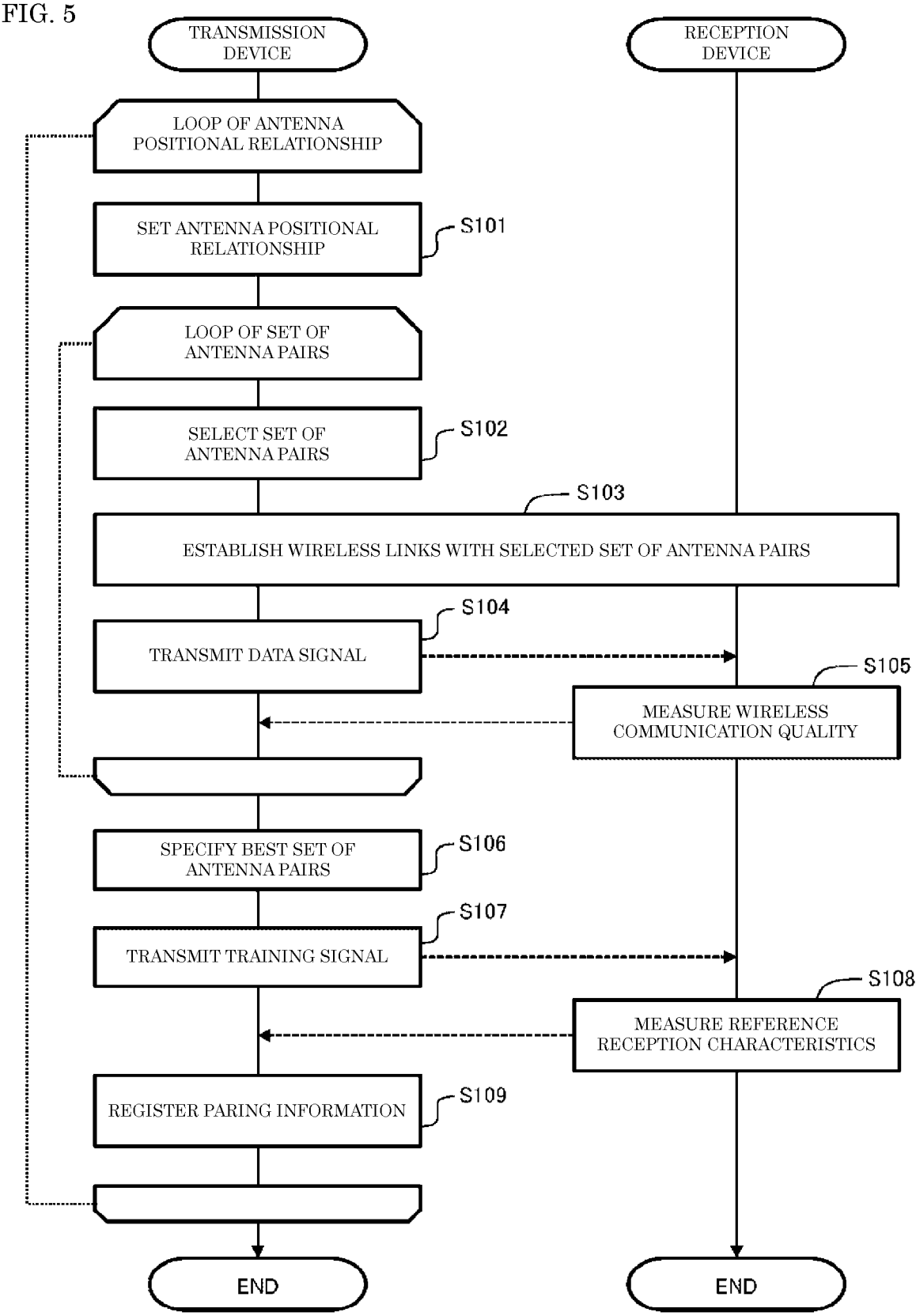
FIG. 5 is a flowchart showing an example of processing of pairing information generation according to the present exemplary embodiment.

In S107 of FIG. 5, pairing information generation unit 103 may transmit a training signal from each of the plurality of transmission antennas 102 and obtain reference reception characteristics corresponding to each training signal. In this way, a number of samples increases and thus accuracy of the reference reception characteristics increases.

In a case where transmission antennas 102 each are an array antenna including a plurality of antenna elements, pairing information generation unit 103 may transmit training signals from transmission antennas 102 in a plurality of different angular directions and obtain the reference reception characteristics corresponding to the respective angular directions.

Pairing information generation unit 103 may transmit training signals from transmission antennas 102 using different frequency channels and obtain the reference reception characteristics corresponding to the respective frequency channels.

Pairing information generation unit 103 may transmit a training signal a plurality of times from transmission antennas 102 and obtain the reference reception characteristics by averaging the reception characteristics corresponding to the training signal of each time.

Transmission antennas 102, reception antennas 202, and wireless links 400 are not necessarily aligned in a straight line, and may be distributed in two-dimensional directions or three-dimensional directions.

Reception device 200 need not necessarily receive a training signal using all reception antennas 202, and may receive the training signal using at least one reception antenna 202.

For wireless link communication between transmission antennas 102 and reception antennas 202, a wireless wave having a wavelength different from a millimeter wave such as a centimeter wave or a sub-millimeter wave (terahertz wave) may be used.

<Effects of Present Exemplary Embodiment>

In the present exemplary embodiment, wireless communication system 1 including transmission device 100 and reception device 200 associates reference reception characteristics that change depending on positional relationships between transmission antennas and reception antennas with a best set of antenna pairs as pairing information in advance, and registers the pairing information in pairing information management unit 104. Wireless communication system 1 then transmits a training signal from transmission antenna 102 in a stop position of transmission device 100 or reception device 200, specifies measured reception characteristics of the training signal in reception antennas 202, compares the reference reception characteristics included in the pairing information and the measured reception characteristics, specifies the best set of antenna pairs associated with the reference reception characteristics, and establishes wireless links 400 according to the specified best set of antenna pairs.

In this way, compared to a case where the best set of antenna pairs is searched for every time the antenna positional relationships change, the best set of antenna pairs can be specified and wireless links can be established in a short period of time. This is useful for a situation in which the antenna positional relationships may change every time a large volume of delivery data is transmitted by wireless from transmission device 100 to reception device 200 in a predetermined period of time.

The exemplary embodiment according to the present disclosure have been described above with reference to the drawings. Functions of transmission device 100 and reception device 200 described above are achieved by computer programs.

Figure 7:
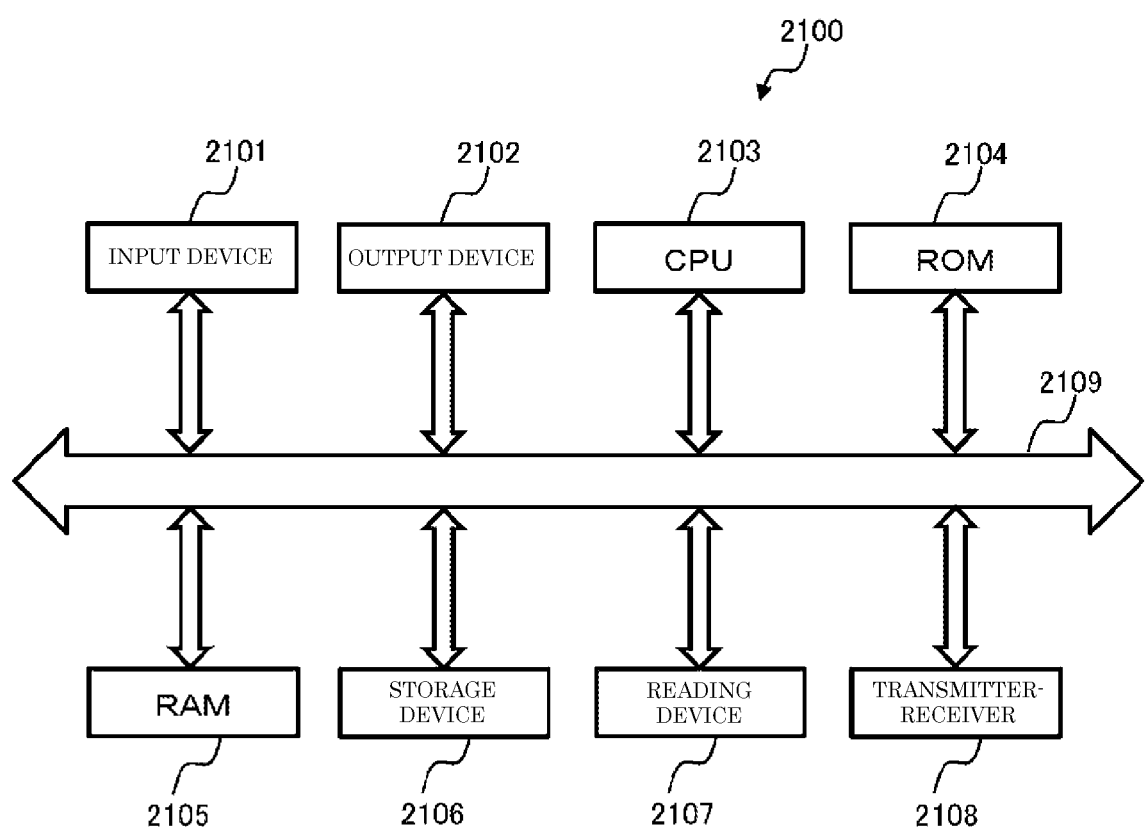
FIG. 7 is diagram showing an example of a hardware configuration according to the exemplary embodiment of the present disclosure.

FIG. 7 is a hardware configuration of a computer that achieves a function of each device by a program. This computer 2100 includes input device 2101 such as a keyboard, a mouse, or a touch pad, output device 2102 such as a display or a speaker, central processing unit (CPU) 2103, read only memory (ROM) 2104, random access memory (RAM) 2105, storage device 2106 such as a hard disk device or a solid state drive (SSD), reading device 2107 that reads information from a recording medium such as a digital versatile disk read only memory (DVD-ROM) or a universal serial bus (USB) memory, and transmitter-receiver (transmission-reception unit) 2108 that performs communication via a network, and each unit is connected via bus 2109.

From a recording medium that has recorded a program for achieving a function of each of the devices described above, reading device 2107 reads the program and stores the program in storage device 2106. Alternatively, transmitter-receiver 2108 performs communication with a server device connected to a network and stores in storage device 2106 the program downloaded from the server device for achieving a function of each of the devices described above.

CPU 2103 then makes a copy of the program stored in storage device 2106 in RAM 2105, sequentially reads instructions included in the program from RAM 2105, and executes the instructions to achieve the function of each of the devices described above.

The functional blocks used in the descriptions of the exemplary embodiment described above can be typically implemented as a large-scale integration (LSI) that is an integrated circuit. The functional blocks may be individually implemented as separate chips or some or all of the functional blocks may be integrated into one chip. Here, an LSI is exemplified, but the LSI may be referred to as an integrated circuit (IC), a system LSI, a super LSI, or an ultra LSI depending on the difference in the degree of integration.

Further, the circuit integration is not necessarily implemented by an LSI, and may be implemented by a dedicated circuit or a general-purpose processor. A field programmable gate array (FPGA) that can be programmed after the manufacture of the LSI or a reconfigurable processor in which the connections and the settings of circuit cells disposed inside the LSI can be reconfigured may be used.

Further, when there emerges a technique for circuit integration that replaces the LSI as a result of the advancement of semiconductor technology or other derivative technology, the functional blocks may be integrated by using that technique. Application of biotechnology or the like may be possible. In the descriptions above, the expression of "unit" used for the components may be replaced by another expression such as "circuitry", "device", or "module".

The present disclosure is applicable to a wireless communication system and a wireless communication method between automobiles, between an automobile and a device installed on a road, between an automobile and a device installed in a store, between an aircraft and an accommodation ladder (passenger steps), or between a train and a station platform, which transmit and receive data by wireless.

What is claimed is:

1. A wireless communication system comprising:
    a plurality of transmission antennas;
    a plurality of reception antennas;
    pairing information management circuitry configured to store a plurality of combinations of a positional arrangement, antenna-pair set information, and a measurement result, in a one-to-one correspondence, wherein the positional arrangement indicates a configuration of the plurality of transmission antennas and the plurality of reception antennas, the antenna-pair set information indicates information on a set of pairs of the transmission antennas and the reception antennas that achieves a highest throughput for the corresponding positional arrangement, and the measurement result indicates at least one of reception characteristics of a training signal transmitted from at least one of the plurality of transmission antennas and measured at the plurality of reception antennas in the corresponding positional arrangement;
    pairing determination circuitry configured to select current antenna-pair set information corresponding to a current positional arrangement for communication between the plurality of transmission antennas and the plurality of reception antennas by comparing a current measurement result with the measurement results stored in the pairing information management circuitry, wherein the current measurement result indicates at least one of reception characteristics of the training signal transmitted from at least one of the plurality of transmission antennas and measured at the plurality of reception antennas in the current positional-arrangement; and
    link establishing circuitry configured to establish links between the plurality of transmission antennas and the plurality of reception antennas based on the current antenna-pair set information corresponding to the current positional arrangement,
    wherein at least one of the plurality of transmission antennas or the plurality of reception antennas is to be mounted on a mobile unit.

2. The wireless communication system according to claim 1, wherein the pairing determination circuitry is configured to select the current antenna-pair set information corresponding to the current positional arrangement based on a difference between the current measurement result and each of the stored measurement results.

3. The wireless communication system according to claim 1, comprising transmission circuitry, which includes the plurality of transmission antennas, the pairing information management circuitry, the pairing determination circuitry, and the link establishing circuitry.

4. The wireless communication system according to claim 1, comprising reception circuitry, which includes the plurality of reception antennas, the pairing information management circuitry, the pairing determination circuitry, and the link establishing circuitry.

5. The wireless communication system according to claim 1, comprising:
    transmission circuitry, which includes the plurality of transmission antennas and at least one of the pairing information management circuitry, the pairing determination circuitry, or the link establishing circuitry, and
    reception circuitry, which includes the plurality of reception antennas and remaining one(s) of the pairing information management circuitry, the pairing determination circuitry, or the link establishing circuitry.

6. A wireless communication method in a wireless communication system that includes a plurality of transmission antennas and a plurality of reception antennas, at least one of the plurality of transmission antennas or the plurality of reception antennas being mounted on a mobile unit, the wireless communication method comprising:
    storing a plurality of combinations of a positional arrangement, antenna-pair set information and a measurement result, in a one-to-one correspondence, wherein the positional arrangement indicates a configuration of the plurality of transmission antennas and the plurality of reception antennas, the antenna-pair set information indicates information on a set of pairs of the transmission antennas and the reception antennas that achieves a highest throughput for the corresponding positional arrangement, and the measurement result indicates at least one of reception characteristics of a training signal transmitted from at least one of the plurality of transmission antennas and measured at the plurality of reception antennas in the corresponding positional arrangement;
    selecting current antenna-pair set information corresponding to a current positional arrangement for communication between the plurality of transmission antennas and the plurality of reception antennas by comparing a current measurement result with the stored measurement results, wherein the current measurement result indicates at least one of reception characteristics of the training signal transmitted from at least one of the plurality of transmission antennas and measured at the plurality of reception antennas in the current positional arrangement; and establishing links between the plurality of transmission antennas and the plurality of reception antennas based on the current antenna-pair set information corresponding to the current positional arrangement.

* * * * *